(12) United States Patent
Maeda et al.

(10) Patent No.: US 7,832,536 B2
(45) Date of Patent: Nov. 16, 2010

(54) SUPPORTING STRUCTURE FOR A ONE-WAY CLUTCH

(75) Inventors: Kazuhito Maeda, Neyagawa (JP); Ryousuke Iida, Neyagawa (JP)

(73) Assignee: Exedy Corporation, Osaka (JP)

( * ) Notice: Subject to any disclaimer, the term of this patent is extended or adjusted under 35 U.S.C. 154(b) by 366 days.

(21) Appl. No.: 12/018,078

(22) Filed: Jan. 22, 2008

(65) Prior Publication Data
US 2008/0173511 A1    Jul. 24, 2008

(30) Foreign Application Priority Data
Jan. 22, 2007    (JP)    ............... 2007-011928

(51) Int. Cl.
*F16D 33/18*    (2006.01)
*F16D 41/06*    (2006.01)
(52) U.S. Cl. .............. 192/41 R; 192/45; 192/45.1; 192/110 B; 192/115; 60/345
(58) Field of Classification Search ............. 192/115; 60/345
See application file for complete search history.

(56) References Cited

U.S. PATENT DOCUMENTS

| 4,441,315 A | * | 4/1984 | Bochot | 60/345 |
| 4,953,353 A | * | 9/1990 | Lederman | 60/345 |
| 6,044,946 A | * | 4/2000 | Makino et al. | 192/45 |
| 6,814,203 B2 | * | 11/2004 | Kamiya et al. | 192/45.1 |
| 6,941,752 B2 | * | 9/2005 | Ochi et al. | 60/345 |
| 7,100,755 B2 | * | 9/2006 | Takasu | 192/45.1 |

FOREIGN PATENT DOCUMENTS

JP    2006-170345 A    6/2006

* cited by examiner

*Primary Examiner*—Richard M. Lorence
(74) *Attorney, Agent, or Firm*—Global IP Counselors, LLP

(57) ABSTRACT

A supporting structure for a one-way clutch supports the one-way clutch arranged between a stator of a torque converter for transmitting a torque from an engine to a transmission side via a fluid and a shaft at the transmission side. The supporting structure includes a first protrusion and a first contact plate. The first protrusion is provided at an inner periphery of the stator and protruding towards an inner-peripheral side of the stator. The first contact plate is fitted between the one-way clutch and the first protrusion of the stator and supports the one-way clutch while restraining an axial movement of the one-way clutch.

21 Claims, 2 Drawing Sheets

SUPPORTING STRUCTURE FOR A ONE-WAY CLUTCH

CROSS-REFERENCE TO RELATED APPLICATIONS

This application claims priority to Japanese Patent Application No. 2007-11928 filed on Jan. 22, 2007. The entire disclosure of Japanese Patent Application No. 2007-11928 is hereby incorporated herein by reference.

BACKGROUND OF THE INVENTION

1. Field of the Invention

The present invention relates to a supporting structure for a one-way clutch. More specifically, the present invention pertains to a supporting structure for a one-way clutch arranged between a stator of a torque converter for transmitting torque from an engine to a transmission via fluid and a shaft at the transmission.

2. Background Information

A torque converter, which serves to transmit a torque from an engine to a transmission, includes a front cover to which torque is inputted from an engine, a fluid actuator (fluid operating chamber), which incorporates therein an impeller, a turbine and a stator, and a one-way clutch provided at an inner-peripheral end of the stator.

In the torque converter configuration as described above, torque is transmitted from the engine to a member of the transmission via the front cover and the fluid actuator.

JP2006-170345A discloses therein a torque converter where annular-shaped plates are arranged at both axial sides of a one-way clutch respectively. A snap ring is firmly attached to an outer-peripheral end of the annular plate.

In the torque converter disclosed in JP2006-170345A, the annular plates are positioned relative to the stator by a snap ring. Positioning of the annular plates relative to the stator using the snap ring, however, requires a groove formed at the stator. The groove is specifically designed to receive the snap ring, thereby causing the structure of the torque converter to be complicated and, as a result, increases manufacturing cost.

A need thus exists for a supporting structure for supporting a one-way clutch, which positions an annular plate relative to the stator without using a snap ring and a groove at the stator, and wherein the groove is formed to receive the snap ring.

SUMMARY OF THE INVENTION

A supporting structure for a one-way clutch according to a first aspect of the present invention supports the one-way clutch arranged between a stator of a torque converter for transmitting torque from an engine to a transmission side via fluid and a shaft of the transmission. The supporting structure includes a protrusion and a first contact plate. The protrusion is provided at an inner periphery of the stator and protruding radially inwardly. The first contact plate is fitted between a side surface of the one-way clutch and the protrusion of the stator, supports the one-way clutch, and restraining an axial movement of the one-way clutch.

In this supporting structure for the one-way clutch, the one-way clutch is prohibited from displacing in the axial direction by the first contact plate fitted between the one-way clutch and the protrusion of the stator. Here, it is possible to position the first contact plate relative to the stator without a snap ring and a groove formed at the stator, which groove is fitted with the snap ring.

A supporting structure according to a second aspect of the present invention is the supporting structure of the first aspect, wherein the one-way clutch includes an outer race contacting with the inner periphery of the stator and an inner race arranged radially inward of the outer race. The first contact plate is disposed between the protrusion and the outer race. Here, it is possible to position the first contact plate relative to the stator.

A supporting structure according to a third aspect of the present invention is the supporting structure of the first or second aspect, wherein further including a first annular plate arranged to contact with the first contact plate, a second annular plate arranged to face the first annular plate, and a first bearing disposed between the first annular plate and the second annular plate. Here, because the first contact plate does not contact with the first bearing directly, the first contact plate is less worn out.

A supporting structure according to a fourth aspect of the present invention is the supporting structure of any one of the first through third aspects, wherein further including a second plate in contact with the one-way clutch and supporting the one-way clutch. The second plate is provided with an engagement portion, whereby the engagement portion is engaged with a substantially annular-shaped recess formed at the one-way clutch. Here, the second contact plate is mounted on the one-way clutch by engaging the engagement portion with the recess.

A supporting structure according to a fifth aspect of the present invention is the supporting structure of the fourth aspect, wherein the engagement portion includes a plurality of protrusions arranged to protrude from an outer peripheral end of the second plate to the engine side. Here, it is possible to mount the second contact plate on the one-way clutch by engaging the protrusions with the recess.

A supporting structure according to a sixth aspect of the present invention is the supporting structure of any one of the first through fifth aspects, wherein further including a third annular plate contacting with the stator and another side surface of the one-way clutch and supporting the one-way clutch, a fourth annular plate arranged to face the third annular plate, and a second bearing arranged between the third annular plate and the fourth annular plate. Here, because the second bearing does not contact with the one-way clutch directly when the fourth annular plate rotates, it is possible to prevent the one-way clutch from being worn out.

A supporting structure according to a seventh aspect of the present invention is the supporting structure of any one of the first through sixth aspects, wherein a thrust load applied to the second bearing is applied to the outer race via the third annular plate. Here, a position precision of the first contact plate is enhanced.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

A. Structure

Figure 1:
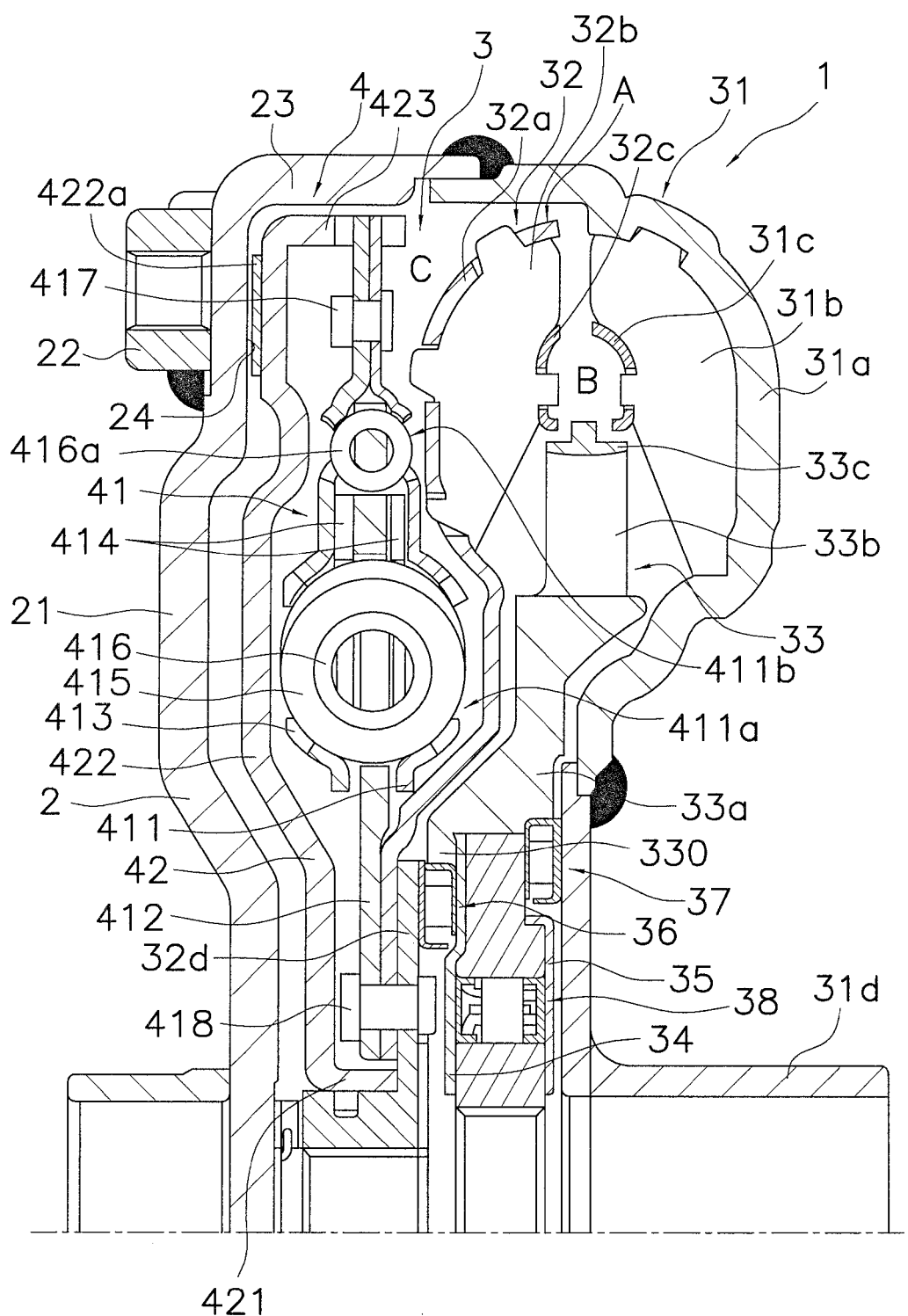
FIG. 1 is a cross-sectional view illustrating a torque converter according to an embodiment of the present invention.

FIG. 1 illustrates a torque converter 1 employed according to an embodiment of the present invention. The torque converter 1 is arranged between a crankshaft and an output-side shaft and transmits power of the crankshaft to the output-side shaft. The torque converter 1 mainly includes a front cover 2, a fluid actuator (fluid operating portion) 3, and a lockup device 4.

The front cover 2 is a member inputted with torque by a crankshaft of an engine (not illustrated) and is constructed of a main body 21 having a substantially disc-shaped configuration. A plurality of nuts 22 are fixed to a radially outer portion of the main body 21. A cylindrical portion 23 is formed at the radially outer portion of the main body 21 and extends to the transmission-side. A frictional surface 24, which is flat and annular-shaped, is formed at the radially outer portion inside (right-side in FIG. 1) of the main body 21 of the front cover 2. That is, the frictional surface 24 is provided at the transmission-side in an axial direction (left and right directions in FIG. 1).

The fluid actuator 3 includes an impeller 31, a turbine 32, a stator 33, a first contact plate 34, a second contact plate 35, a first bearing 36 and a second bearing 37.

The impeller 31 includes an impeller shell 31a, plural impeller blades 31b fixed to an inner surface of the impeller shell 31a, an impeller core 31c fixed inside the impeller blades 31b and an impeller hub 31d secured to an inner rim of the impeller shell 31a. An outer peripheral portion of the impeller shell 31a extends towards the front cover 2 (the left in FIG. 1) and is firmly welded to an impeller-side end of the front cover 2. Therefore, the impeller 31 and the front cover 2 define a fluid chamber A, which is filled with hydraulic oil. The fluid chamber A is divided into a fluid actuator (fluid operating chamber) B as the fluid actuator 3 and a chamber C surrounded by the main body 21 of the front cover 2 and the turbine 32.

The turbine 32 is arranged to face the impeller 31 in the fluid chamber A. The turbine 32 includes a turbine shell 32a, a plurality of turbine blades 32b fixed to the turbine shell 32a, a turbine core 32c fixed inside the turbine blades 32b, and a turbine hub 32d secured to an inner rim of the turbine shell 32a.

The stator 33 is arranged between an inner circumferential surface of the impeller 31 and an inner circumferential surface of the turbine 32. The stator 33 is a mechanism that serves to rectify flow of hydraulic oil (fluid) that returns from the turbine 32 to the impeller 31. The stator 33 includes a stator carrier 33a, a plurality of stator blades 33b firmly attached to an outer peripheral surface of the stator carrier 33a, and a stator core 33c secured inside the stator blades 33b. The stator carrier 33a includes a first protrusion 330 (serving as a protrusion) that is formed at an inner periphery of the stator 33 and protrudes towards an inner-peripheral side of the stator. The first protrusion 330 may be formed at an engine-side end of the inner periphery of the stator 33, i.e., of an inner periphery of the stator carrier 33a. The stator carrier 33a is supported by a fixed shaft (not illustrated in the figures) via a one-way clutch 38.

Figure 2:
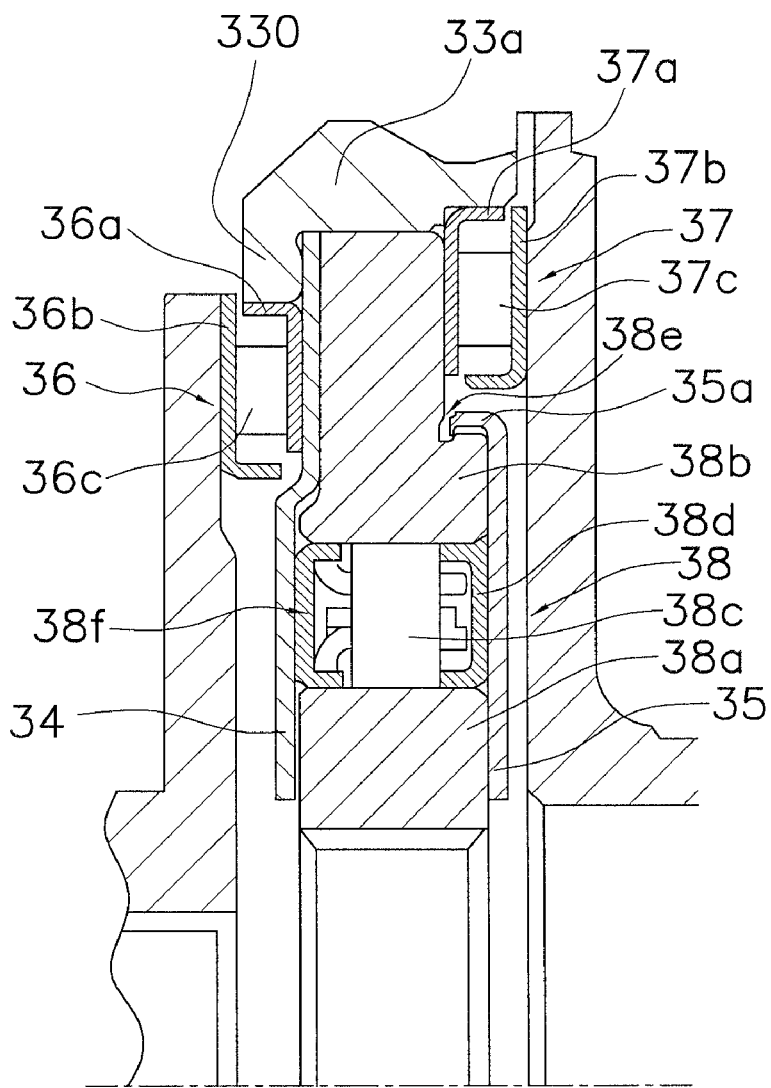
FIG. 2 is a partially enlarged view of FIG. 1.

The one-way clutch 38 of FIG. 2 includes an inner race 38a, an outer race 38b, rollers 38c and end bearings 38d. The inner race 38a is an annular-shaped member mounted on an output-side shaft (not illustrated in figures). The outer race 38b is arranged at the outer peripheral side of the inner race 38a, and an outer periphery of the outer race 38b is in contact with the inner periphery of the stator 33. The outer race 38b is formed with a substantially annular shaped recess 38e at a surface thereof at the transmission side. More specifically, the outer race 38b is formed with a substantially annular shaped recess 38e at an outer periphery of an inner rim thereof at the transmission side. Formed between the outer race 38b and the inner race 38a are pockets 38f arranged in a circumferential direction of the outer and inner races 38b, 38a. The rollers 38c are housed in the pockets 38f, respectively. In other words, the rollers 38c are arranged between the inner race 38a and the outer race 38b in a radial direction and arranged to be equally spaced from an adjacent roller in the circumferential direction. That is, the end bearings 38d are arranged at both axial sides of the rollers 38c, respectively so that the end bearings 38d cover both axial ends of the respective pockets 38f. The outer periphery of the outer race 38b is knurled and the one-way clutch 38 is press-fitted into the inner-periphery of the stator carrier 33a.

A second bearing 37 is arranged between the stator carrier 33a and the impeller hub 31d in the axial direction. A plurality of grooves, which extend radially, are formed at the stator carrier 33a at the transmission-side in the axial direction. Accordingly, these grooves allow for fluid communication of the hydraulic oil between both sides of the thrust bearing in the radial direction.

The first contact plate 34 of FIG. 2 has a substantially annular shape. The radially outer end portion along the periphery of the first contact plate 34 is fitted between the first protrusion 330 of the stator carrier 33a and the outer race 38b of the one-way clutch 38. Further, the first contact plate 34 is in contact with a side surface of the one-way clutch 38 at the engine side and supports the one-way clutch 38. The first contact plate 34 restrains an axial movement of the one-way clutch 38. Still further, the first contact plate 34 is arranged to cover the pockets 38f of the one-way clutch 38.

The second contact plate 35 of FIG. 2, which also has a substantially annular shape, is arranged to be in contact with the other side surface of the one-way clutch 38 at the transmission side (the right in FIG. 2) and to support the one-way clutch 38. Further, the second contact plate 35 is arranged to cover the pockets 38f of the one-way clutch 38. The second contact plate 35 is formed with a plurality of second protrusions 35a (engagement portion) protruding at its outer peripheral end and extending towards the engine side in the axial direction. Each second protrusion 35a is formed with a distal end, which is generally hook shaped and engages with the substantially annular-shaped recess 38e formed at the outer race 38b.

The first bearing 36 of FIG. 2 is arranged at the engine-side of the first contact plate 34 and includes a first annular plate 36a, a second annular plate 36b, and a first bearing 36c. The first annular plate 36a has a relatively elongated section and a radially outer end section. The radially outer end section of the first annular plate 36a is bent towards the engine side. The elongated section of the first annular plate 36a is arranged to be in contact with the first contact plate 34. The second annular plate 36b has a relatively elongated section and a radially inner end section. The radially inner end section of the second annular plate 36b is bent away from the engine side towards the transmission side. The elongated section of the second annular plate 36b is in contact with the turbine hub 32d so that the second annular plate 36b is arranged to face the first annular plate 36a. The first bearing 36c is disposed between and in contact with the elongated section of the first annular plate 36a and the second annular plate 36b.

The second bearing 37 of FIG. 2 is arranged at the transmission side of the outer race 38b of the one-way clutch 38. The second bearing 37 includes a third annular plate 37a, a fourth annular plate 37b and a second bearing 37e. The radially outer end section of the third annular plate 37a is bent towards the transmission side. The elongated section of the third annular plate 37a is arranged to be in contact with the outer race 38b of the one-way clutch 38 and generally to support the one-way clutch 38. Specifically, the third annular plate 37a may also be in contact with the stator 33 and the other side surface of the one-way clutch 38. The fourth annular plate 37b has a relatively elongated section and a radially inner end section. The radially inner end section of the fourth annular plate 37b is bent away from the transmission side towards the engine side. The fourth annular plate 37b is arranged to face the third annular plate 37a and to be in contact with the impeller hub 31d. The second bearing 37c is disposed between and in contact with the third annular plate 37a and the fourth annular plate 37b. Thrust load acting on the second bearing 37 is applied to the outer race 38b via the third annular plate 37a.

Chamber C is a substantially annular shaped space defined by the main body 21 of the front cover 2 and the turbine 32 in the axial direction. The engine-side of chamber C in the axial direction is defined by the main body 21 of the front cover 2, and the transmission-side is defined by the turbine shell 32a of the turbine 32. Further, a radially outer side of chamber C is defined by an inner circumferential surface of a cylindrical portion, and a radially inner side thereof is defined by an outer periphery of the turbine hub 32d. As described above, chamber C communicates with an external oil-pressure operating mechanism between the radially inner side, i.e., the inner peripheral portion of the front cover 2, and the turbine hub 32d. Chamber C further communicates with the fluid actuator B via a clearance between a fluid exit of the impeller 31 and a fluid inlet of the turbine 32.

The lockup device 4 is arranged inside chamber C and is adjusted to mechanically engage or disengage the front cover 2 and the turbine 32 in response to variations in oil pressure in chamber C. The lockup device 4 mainly includes a damper mechanism 41 and a piston 42.

The damper mechanism 41 is configured to absorb or attenuate torsional vibrations in a rotational direction and includes a retaining plate 411, a hub flange 412, a driven plate 413, a pair of intermediate plates 414, first coil springs 415, second coil springs 416, and outer springs 416a. According to the embodiment, the hub flange 412 serves as a drive-side member and the retaining plate 411 and the driven plate 413 serve as a driven-side member.

The retaining plate 411 is a substantially annular-shaped plate member and is formed with first window bores 411a at its inner-peripheral side. The first window bores 411a are arranged to accommodate first coil springs 415 respectively. The retaining plate 411 is formed with second window bores 411b located at approximately its intermediate in a radial direction. The second window bores 411b are arranged to accommodate outer coil springs 416a respectively. The retaining plate 411 is secured to the driven plate 413 by rivets 417 at its outer peripheral side and is engaged with the piston 42 at a radially outer end.

The hub flange 412 is a plate member disposed between the retaining plate 411 and the driven plate 413 and is formed into substantially an annular shape. The hub flange 412 is formed with window bores at an area corresponding to the first window bores 411a of the retaining plate 411 and is further formed with other window bores at an area corresponding to the second window bores 411b of the retaining plate 411. The radially inner portion of the hub flange 412 is secured to the turbine hub 32b by rivets 418.

The driven plate 413 is a plate member arranged to face the retaining plate 411 and is formed into a substantially annular shape. The driven plate 413 is formed with window bores, of which shape is substantially the same as the shape of the first window bore 411a, at an area corresponding to the first window bores 411a. The driven plate 413 is further formed with other window bores, of which shape is substantially the same as the shape of the second window bore 411b, at an area corresponding to the second window bores 411b.

The pair of intermediate plates 414 is arranged at both axial sides of the hub flange 412 and between the retaining plate 411 and the driven plate 413. Each intermediate plate 414 is substantially annular-shaped and formed with window bores at an area corresponding to the positions of the first window bores 411a in the radial direction. The window bores of the intermediate p-late plates 414 generally extend in a circumferential direction beyond that of the first window bores 411a.

The first coil springs 415 are housed inside the first window bores 411a and are supported by the retaining plate 411, the driven plate 413, the hub flange 412, and the intermediate plates 414.

Each second coil spring 416 is configured to be arranged inside the corresponding first coil spring 415 with a first end fixed to a circumferential end of the first window bore 411a. The second coil spring 416 has a second end as an opening end.

The piston 42 is a member movable towards the front cover 2 in response to changes in an oil pressure in the chamber C and includes a first cylindrical portion 421, an annular portion 422, and a second cylindrical portion 423. The first cylindrical portion 421 is provided at an outer peripheral side of the turbine hub 32d and is firmly attached to the turbine hub 32d. The annular portion 422 is a plate member formed into a substantially annular shape and is attached with a frictional portion 422a at its radially outer side, which frictionally engages with the frictional surface 24 of the front cover 2. The annular portion 422 is arranged between the front cover 2 and the damper mechanism 41 in the axial direction, and a radially intermediate portion of the annular portion 422 is hollow in the direction of the front cover 2. The second cylindrical portion 423 extends from radially outer end of the annular portion 422 towards the transmission side in the axial direction and is engaged with the retaining plate 411 and the driven plate 413.

B. Operation

Described below is a clutch coupling operation. Torque is transmitted from a crankshaft of the engine-side to the front cover 2, so that the impeller shell 31a is rotated. Hydraulic oil flows from the side of the impeller 31 to the side of the turbine 32 in response to rotation of the impeller shell 31a, so that the turbine 32 is rotated. Torque of the turbine 32 is transmitted to the input-side shaft, which is not illustrated. By changing an oil pressure passage of the hydraulic oil, the hydraulic oil inside the fluid actuator 3 flows outside the fluid chamber and pushes the piston 42 towards the front cover 2. When the piston 42 is pressed by the hydraulic oil, the frictional portion 422a of the piston 42 and the frictional surface 24 of the front cover 2 are frictionally engaged with each other, so that torque transmitted from the engine to the front cover 2 is transmitted to the piston 42. Torque transmitted to the piston 42 is transmitted in the order to the driven plate 413 and the retaining plate 411, the outer springs 416a, the first and second coil springs 415, 416, and the hub flange 412 and is outputted to the turbine hub 32d.

According to the embodiment of the present invention, the first contact plate 34 is fitted between the first protrusion 33d of the stator carrier 33a and the outer race 38b of the one-way clutch, so that the first contact plate 34 is positioned relative to the stator 33. Therefore, the supporting structure for the one-way clutch described above enables to position the first contact plate 34 relative to the stator 33 without a snap ring and a groove at the stator 33, which groove is fitted with the snap ring, thereby suppressing a manufacturing cost with a simple structure. Further, the second protrusions 35a of the second contact plate 35 are engaged with the recess 38e of the outer race 38b, so that the second contact plate 35 is mounted on the one-way clutch 38. Still further, because the first contact plate 34 and the first bearing 36c do not contact each other directly, the first contact plate 34 is less worn out.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having" and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a hydraulic torque transmitting device equipped with the present invention. Accordingly, these terms, as utilized to describe the present invention should be interpreted relative to a hydraulic torque transmitting device equipped with the present invention as normally used. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A supporting structure for a one-way clutch the supporting structure comprising:
    a protrusion provided at an inner periphery of a stator of a torque converter and protruding radially inwardly;
    a first contact plate fitted between a side surface of the one-way clutch and the protrusion of the stator carrier, supporting the one-way clutch and restraining an axial movement of the one-way clutch; and
    a first bearing section supporting the one-way clutch in an axial direction via the first contact plate, the first bearing section being in contact with the protrusion in a radial direction.

2. The supporting structure for the one-way clutch according to claim 1, wherein the one-way clutch includes an outer race contacting with the inner periphery of the stator and an inner race arranged radially inward of the outer race, and wherein the first contact plate is disposed between the protrusion and the outer race.

3. The supporting structure for the one-way clutch according to claim 2, wherein
    the first bearing section includes
        a first annular plate arranged to contact with the first contact plate,
        a second annular plate opposed to the first annular plate, and
        a first bearing disposed between the first annular plate and the second annular plate.

4. The supporting structure for the one-way clutch according to claim 3, further comprising
    a second contact plate in contact with the one-way clutch and supporting the one-way clutch, the second contact plate having an engagement portion, wherein the engagement portion is engaged with a substantially annular-shaped recess in the one-way clutch.

5. The supporting structure for the one-way clutch according to claim 4, wherein the engagement portion includes a plurality of protrusions arranged to protrude from an outer peripheral end of the second contact plate to the engine side.

6. The supporting structure for the one-way clutch according to claim 5, further comprising
    a second bearing section including
        a third annular plate in contact with the stator and a side surface of the one-way clutch to support the one-way clutch,
        a fourth annular plate opposed to the third annular plate, and
        a second bearing disposed between the third annular plate and the fourth annular plate.

7. The supporting structure for the one-way clutch according to claim 6, wherein a thrust load applied to the second bearing section is applied to the outer race via the third annular plate.

8. The supporting structure for the one-way clutch according to claim 2, further comprising
    a second contact plate in contact with the one-way clutch and supporting the one-way clutch, the second contact plate having an engagement portion, wherein the engagement portion is engaged with a substantially annular-shaped recess in the one-way clutch.

9. The supporting structure for the one-way clutch according to claim 8, wherein the engagement portion includes a plurality of protrusions arranged to protrude from an outer peripheral end of the second contact plate to the engine side.

10. The supporting structure for the one-way clutch according to claim 9, further comprising
    a third annular plate in contact with the stator and a side surface of the one-way clutch to support the one-way clutch,
    a fourth annular plate opposed to the third annular plate, and
    a second bearing section disposed between the third annular plate and the fourth annular plate.

11. The supporting structure for the one-way clutch according to claim 10, wherein a thrust load applied to the second bearing section is applied to the outer race via the third annular plate.

12. A supporting structure for the one-way clutch according to claim 1, wherein
the first bearing section includes
a first annular plate arranged to contact with the first contact plate and the protrusion,
a second annular plate opposed to the first annular plate, and
a first bearing disposed between the first annular plate and the second annular plate.

13. The supporting structure for the one-way clutch according to claim 12, further comprising
a second contact plate in contact with the one-way clutch and supporting the one-way clutch, the second contact plate having an engagement portion, wherein the engagement portion is engaged with a substantially annular-shaped recess in the one-way clutch.

14. The supporting structure for the one-way clutch according to claim 13, wherein the engagement portion includes a plurality of protrusions arranged to protrude from an outer peripheral end of the second contact plate to the engine side.

15. The supporting structure for the one-way clutch according to claim 14, further comprising
a third annular plate in contact with the stator and a side surface of the one-way clutch to support the one-way clutch,
a fourth annular plate opposed to the third annular plate, and
a second bearing section disposed between the third annular plate and the fourth annular plate.

16. The supporting structure for the one-way clutch according to claim 15, wherein a thrust load applied to the second bearing section is applied to the outer race via the third annular plate.

17. The supporting structure for the one-way clutch according to claim 1, further comprising
a second contact plate in contact with the one-way clutch and supporting the one-way clutch, the second contact plate having an engagement portion, wherein the engagement portion is engaged with a substantially annular-shaped recess in the one-way clutch.

18. The supporting structure for the one-way clutch according to claim 17, wherein the engagement portion includes a plurality of protrusions arranged to protrude from an outer peripheral end of the second contact plate to the engine side.

19. The supporting structure for the one-way clutch according to claim 18, further comprising
a third annular plate in contact with the stator and a side surface of the one-way clutch to support the one-way clutch,
a fourth annular plate opposed to the third annular plate, and
a second bearing section disposed between the third annular plate and the fourth annular plate.

20. The supporting structure for the one-way clutch according to claim 19, wherein a thrust load applied to the second bearing section is applied to the outer race via the third annular plate.

21. The supporting structure for the one-way clutch according to claim 1, wherein the protrusion is formed as a unitary one piece member with a stator carrier of the stator.

* * * * *